(12) United States Patent
Soupizon et al.

(10) Patent No.: US 7,037,078 B2
(45) Date of Patent: May 2, 2006

(54) TURBOMACHINE TURBINES WITH BLADE INSERTS HAVING RESONANT FREQUENCIES THAT ARE ADJUSTED TO BE DIFFERENT, AND A METHOD OF ADJUSTING THE RESONANT FREQUENCY OF A TURBINE BLADE INSERT

(75) Inventors: Jean-Luc Soupizon, Vaux le Penil (FR); Patrick Rossi, Asnieres sur Seine (FR); Henri Popinet, Asnieres sur Seine (FR); Sandrine Tourbier, Rueil Malmaison (FR); Claude Bion, Saint Leu la Foret (FR); Charles Balleron, Sartrouville (FR); José Lopez, Cachan (FR); Patrick Girard, Melun (FR); Xavier Lescure, Fontainebleau (FR); Patrice Rosset, Le Mee sur Seine (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/776,290

(22) Filed: Feb. 12, 2004

(65) Prior Publication Data
US 2004/0219024 A1    Nov. 4, 2004

(30) Foreign Application Priority Data
Feb. 13, 2003    (FR) .................................. 03 01715

(51) Int. Cl.
*F01D 5/16* (2006.01)
(52) U.S. Cl. .................. 416/203; 416/191; 416/193 A; 416/248; 416/500; 29/889.1; 29/889.2
(58) Field of Classification Search ........ 416/144–145, 416/203, 248, 500, 219 R, 220 R, 193 A, 416/190–191; 415/119; 29/889, 889.1, 29/889.2, 889.21
See application file for complete search history.

(56) References Cited

U.S. PATENT DOCUMENTS

| | | | | |
|---|---|---|---|---|
| 2,277,484 A | * | 3/1942 | Flanders | 416/219 R |
| 3,400,912 A | * | 9/1968 | Carta et al. | 416/220 R |
| 3,952,391 A | * | 4/1976 | Gee | 416/193 A |
| 4,460,316 A | | 7/1984 | Partington | |
| 4,595,340 A | * | 6/1986 | Klassen et al. | 416/193 A |
| 5,435,694 A | * | 7/1995 | Kray et al. | 416/219 R |
| 5,474,421 A | | 12/1995 | Rossmann | |
| 2004/0076521 A1 | * | 4/2004 | Martin et al. | 416/193 A |
| 2004/0126239 A1 | * | 7/2004 | Gautreau et al. | 416/220 R |

FOREIGN PATENT DOCUMENTS

| | | | |
|---|---|---|---|
| EP | 1 211 382 A2 | 6/2002 | |
| FR | 1578562 | 8/1969 | |
| FR | 2 568 308 | 1/1986 | |
| FR | 2 712 631 | 5/1995 | |
| JP | 52-25905 A * | 2/1977 | 416/193 A |
| JP | 59-5806 A * | 1/1984 | 416/219 R |

* cited by examiner

*Primary Examiner*—Christopher Verdier
(74) *Attorney, Agent, or Firm*—Oblon, Spivak, McClelland, Maier & Neustadt, P.C.

(57) ABSTRACT

In a moving turbine wheel, blade inserts are used with at least two blades interconnected by common outer and inner platforms and sharing a common root. The blade inserts have hollow roots in which respective recesses are formed, and the insert roots belonging to the same wheel and/or two different wheels are voluntarily given different configurations in order to adjust the resonant frequencies of the inserts to values that are significantly different, thereby ensuring that the inserts in the same wheel and/or between two different wheels are out of tune.

22 Claims, 3 Drawing Sheets

TURBOMACHINE TURBINES WITH BLADE INSERTS HAVING RESONANT FREQUENCIES THAT ARE ADJUSTED TO BE DIFFERENT, AND A METHOD OF ADJUSTING THE RESONANT FREQUENCY OF A TURBINE BLADE INSERT

BACKGROUND OF THE INVENTION (1) Field of the Invention

The invention applies to turbomachines, and in particular to aviation turbines and to industrial gas turbines. More particularly, the invention relates to the turbines of such turbomachines, and more precisely still, it relates to adjusting the resonant frequency of the blade inserts of such turbines.

(2) Description of Related Art

Usually, the blade inserts of a turbine comprise a single blade connected both to an outer platform and to an inner platform, which inner platform is in turn extended by a root for fixing the insert to the turbine rotor.

It is important to ensure that undesirable vibrations do not appear in the turbines of turbomachines, and in particular vibrations caused by resonance phenomena, at different operating speeds of the turbomachine.

Unfortunately, given constraints in terms of complying with the required aerodynamic profile for blades and complying with weight and size constraints, the options available for adjusting the resonant frequency of a blade insert by acting on its shape are limited.

Thus, French patent document FR 1 578 562 proposes giving the single-blade inserts of a wheel different characteristics such as roots of different lengths in the radial direction or different dimensions at the levels where the inserts are attached to the rotor. Nevertheless, such solutions are penalizing in terms of insert weight and in terms of complexity in building the rotor or in attaching inserts to the rotor.

BRIEF SUMMARY OF THE INVENTION

An object of the invention is to provide a method of making a turbomachine turbine that makes it possible to avoid undesirable vibrations appearing.

Another object of the invention is to propose a method that provides great latitude in adjusting the resonant frequency of a turbine blade insert without penalizing it from the point of view of its aerodynamic characteristics or its weight and without introducing complication in mounting blade inserts or in building the rotor.

Another object of the invention is to propose a turbine for a turbomachine in which the risk of undesirable vibration appearing is greatly decreased, but without degrading turbine performance.

In a first aspect, the invention provides a method of making a turbomachine turbine, the turbine comprising at least one moving wheel provided with blade inserts, in which method, each of the inserts used for the or each moving wheel comprises at least two blades interconnected by common inner and outer platforms and sharing a common root, at least some of the inserts having a hollow root in which a recess is formed, insert roots belonging to the same wheel and/or insert roots belonging to two different wheels being voluntarily given different configurations for the recesses in their roots so as to adjust the resonant frequencies of said blade inserts to values that are significantly different, thereby ensuring that the blade inserts of a single wheel and/or between two different wheels are out of tune.

In comparison with a wheel built up in conventional manner from single-blade inserts, the use of a root that is shared by a plurality of blades provides greater options for acting on the configuration of a recess in the root for the purpose of adjusting the resonant frequency of a blade insert.

It is thus easier to ensure that the resonant frequencies of the inserts in a single moving wheel are out of tune or that the resonant frequencies of blade inserts belonging to different moving wheels are out of tune, thereby reducing the risk of vibration appearing.

In another of its aspects, the invention provides a method of adjusting the resonant frequency of a moving blade insert for a turbomachine turbine, in which method the insert is made to have at least two blades interconnected by common inner and outer platforms and sharing a common root, and the resonant frequency of the insert is adjusted by forming a recess in the insert root.

In particular, it is possible to make the blade insert with a root in the form of a bulb and to adjust its resonant frequency by acting on the thickness of material on either side of the recess level with a root portion that is neck-shaped.

Advantageously, for a turbine blade insert for use in a turbomachine having a high-pressure compressor (HP) and a low-pressure compressor (LP), the resonant frequency of each insert is adjusted to a value that is at least 14% greater than the excitation mode corresponding to $N_2 - N_1$ where $N_2$ and $N_1$ are the speeds of rotation of the HP and LP compressors.

In yet another aspect of the invention, the invention provides a staged turbine for a turbomachine, which turbine comprises at least one moving wheel fitted with blade inserts each comprising at least two blades interconnected by common outer and inner platforms and sharing a common root, in which turbine at least some of the inserts of the same moving wheel and/or of different moving wheels have hollow roots in which respective recesses are formed presenting configurations that differ so that the inserts have resonant frequencies that are significantly different.

The recess formed in a blade insert root may open out to at least one side of the root, and it may be a blind recess.

Some of the blade inserts may have a root that is solid without any insert.

BRIEF DESCRIPTION OF THE DRAWINGS

The invention will be better understood on reading the following description given by way of non-limiting indication with reference to the accompanying drawings, in which.

DETAINED DESCRIPTION OF THE INVENTION

Figure 1:
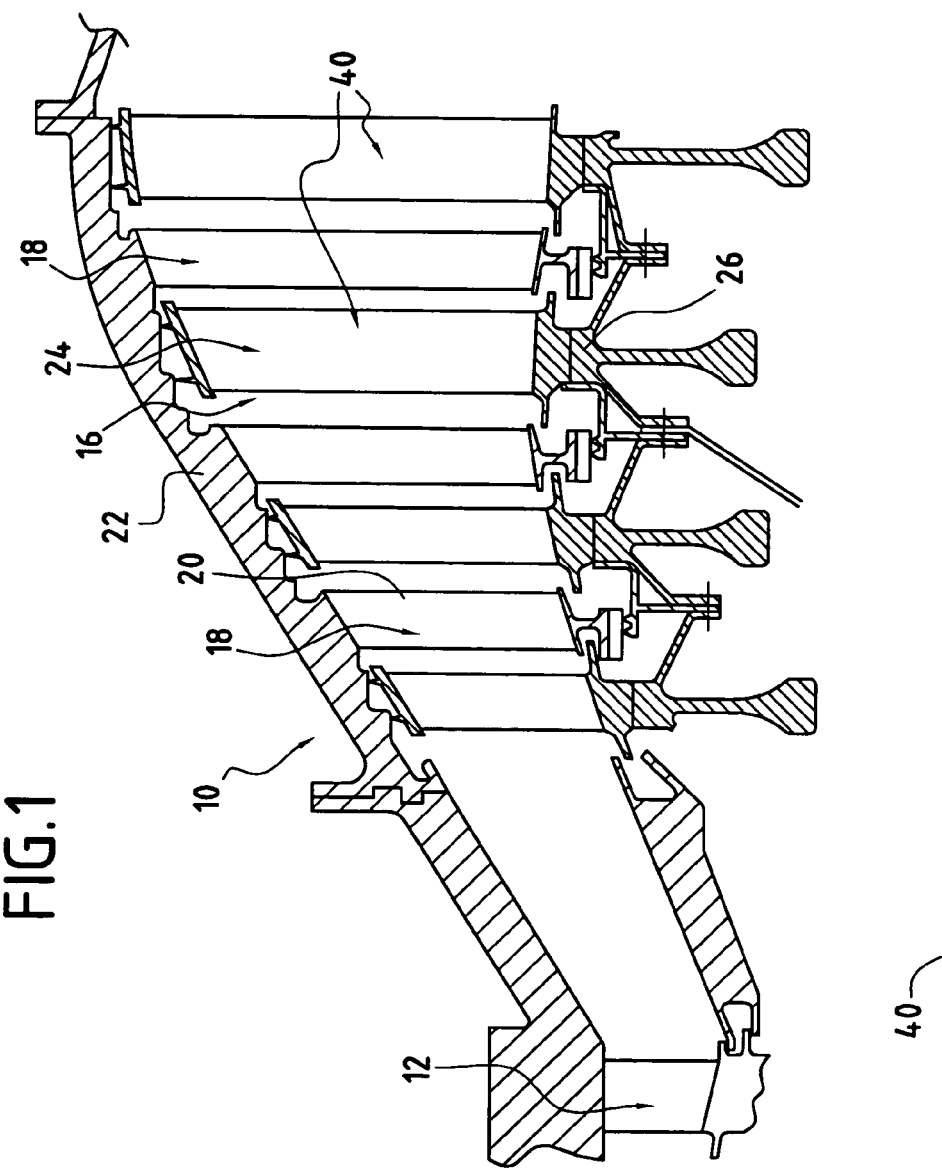
FIG. 1 is a fragmentary diagrammatic section view of a portion of a turbomachine.

FIG. 1 is a highly diagrammatic meridian half-section view of a turbomachine turbine, e.g. in an aircraft turbojet.

In well-known manner, the turbine 10 comprises a high-pressure turbine portion (HP turbine) 12 coupled to a shaft (not shown) for rotating a high-pressure compressor (HP compressor) that is likewise not shown, and a low-pressure turbine portion (LP turbine) 16. This LP turbine comprises a plurality of stages, each stage comprising a set 18 of stationary vane inserts 20 secured to an outer stator 22 together with a wheel 24 of moving blade inserts 40 connected to a rotor 26. The rotor 26 is coupled to a shaft (not shown) for rotating a low-pressure compressor (LP compressor), likewise not shown.

Figure 2:
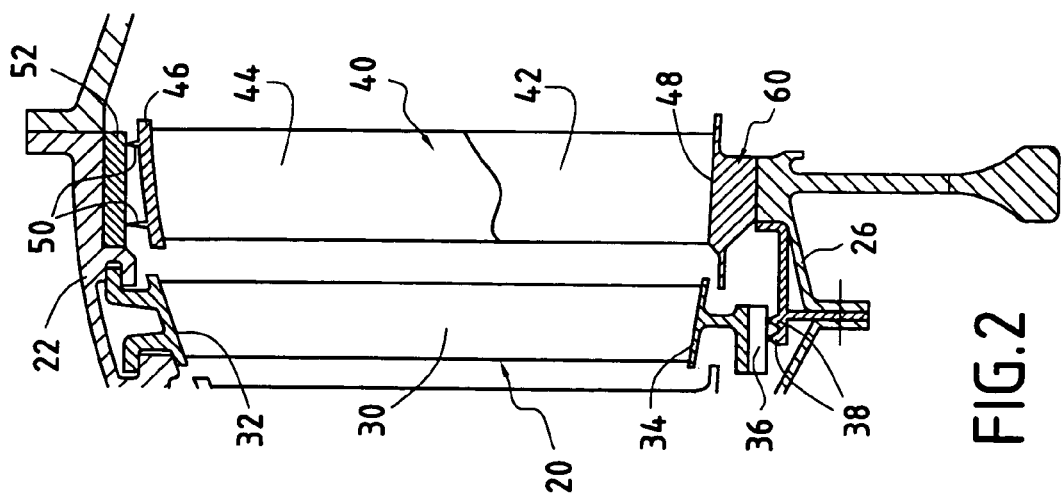
FIG. 2 is a view on a larger scale showing part of FIG. 1.

As can be seen more clearly in FIG. 2, each stationary vane insert 20 comprises a vane 30, an outer platform 32 whereby the vane is connected to the stator 22, and an inner platform 34. The inner platform is provided with an abradable coating 36 facing sealing wipers 38 carried by the rotor 26.

According to a characteristic of the invention, each moving blade insert 40 has a plurality of blades. In the example shown in FIG. 3, each moving blade insert 40 comprises two blades 42, 44. The ends of the blades 42, 44 are interconnected by an outer platform 46 and an inner platform 48 they share in common. A root 60 common to the blades 42 and 44 projects from the inside of the platform 48 for connecting the insert 40 to the rotor 26.

On the outside, the outer platform 46 presents sealing wipers 50 facing an abradable coating 52 carried by the stator 22 (FIG. 2).

Figure 4:
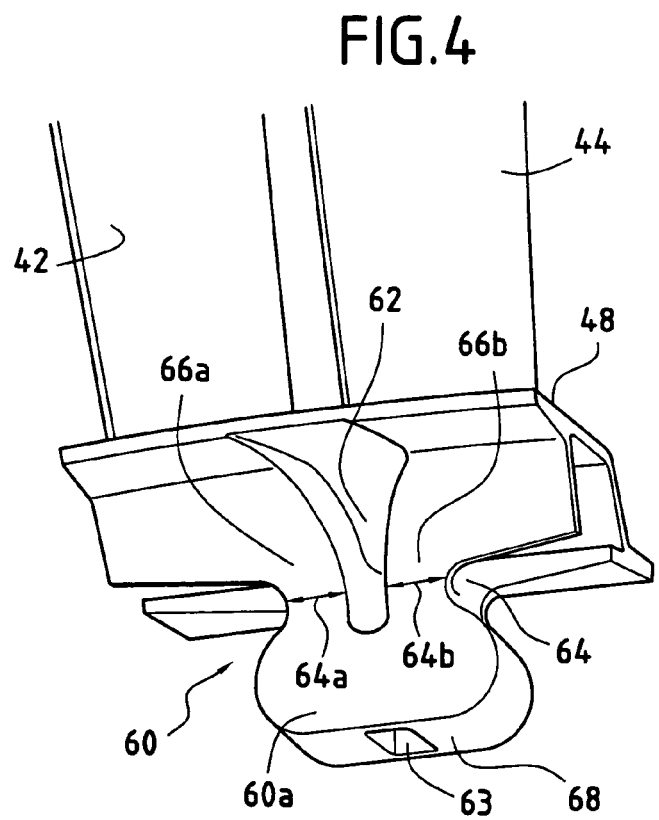
FIG. 4 is a diagrammatic view on a larger scale of the inside end portion of the FIG. 3 insert.

In the embodiment shown, the root 60 is a hollow root that is bulb-shaped. The root 60 presents a blind recess 62 formed in a portion of its thickness, as can be seen in FIG. 4, the recess 62 is open to one side 60a of the root, and specifically the side that is downstream (in the gas flow direction in the turbine). The recess also opens out via an orifice 63 in the base of the root 60. As a result, a flow of air can be established in the recess 62, thereby contributing to cooling the root and the inner platform of the insert. The hollow root can be obtained directly by casting the blade insert. The recess can alternatively be made by machining a solid root.

Figure 5:
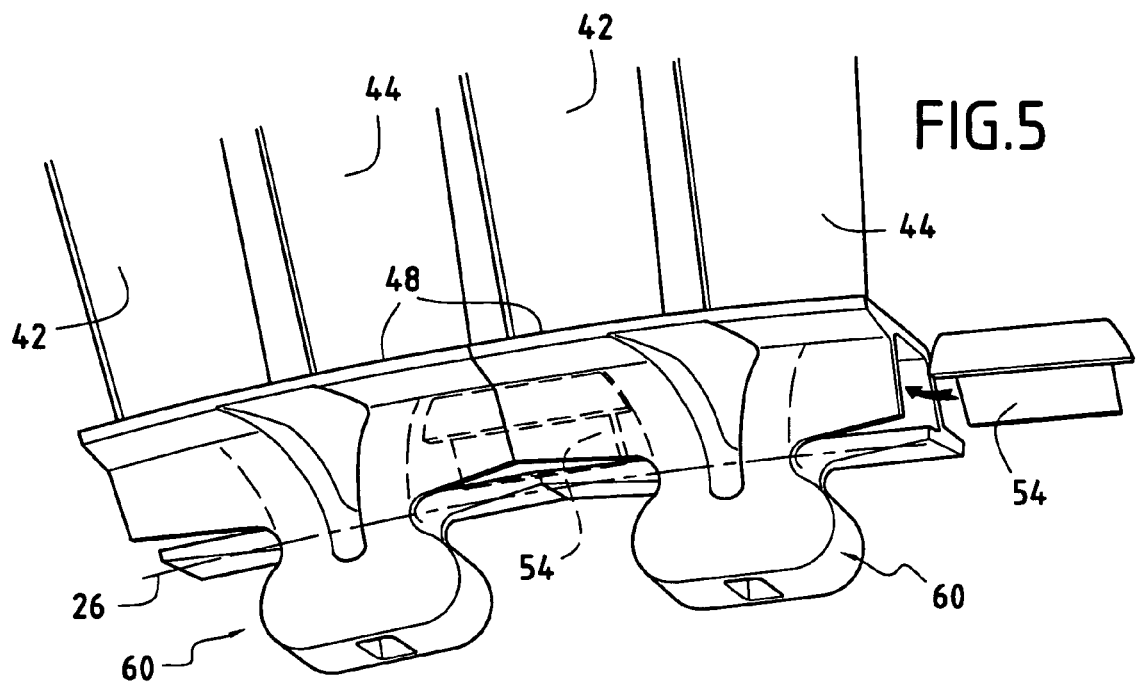
FIG. 5 is a diagrammatic view on a larger scale showing the side-by-side disposition of the inside end portions of two inserts as shown in FIG. 3 disposed side by side in a moving wheel of a turbine.

The connection between the blade insert 40 and the rotor 26 is achieved by engaging the root 60 in a housing of complementary shape formed in the periphery of a rotor disk. Once the inserts have been assembled to the rotor so as to form a complete wheel, the outside faces of the inner platforms 48 make up a continuous inside surface for the gas flow into which the blades 42, 44 extend. Compared with a wheel comprising the same number of blades, but in which the blade inserts have only one blade each, the number of gaps between adjacent inserts is halved. This enables the performance of the turbine to be improved by reducing leaks between insert platforms. Sealing at the junctions between the inner platforms of pairs of adjacent inserts can be improved by means of a deflector-forming piece 54 (FIG. 5). The piece 54 is an annular sector of upside-down channel section bridging the junction between two adjacent inner platforms, and coming into contact with the inside faces of the end portions of said platforms, the flanges of the piece 54 pressing against the facing flanks of the roots 60 of two adjacent blade inserts.

In addition, the outer platform 46 of the insert 40 extends over a circumferential direction that is greater than that of the outer platform of an insert having a single blade only. This makes it possible to implement one or more sealing wipers 50 that extend continuously over a greater distance in the circumferential direction, thereby making it possible to improve sealing between the tips of the moving blade insert 40 and the abradable coating facing them on the stator 22.

According to a particular characteristic of the invention, the resonant frequency of a moving blade insert 40 is adjusted by acting on the configuration of the insert root.

Figure 3:
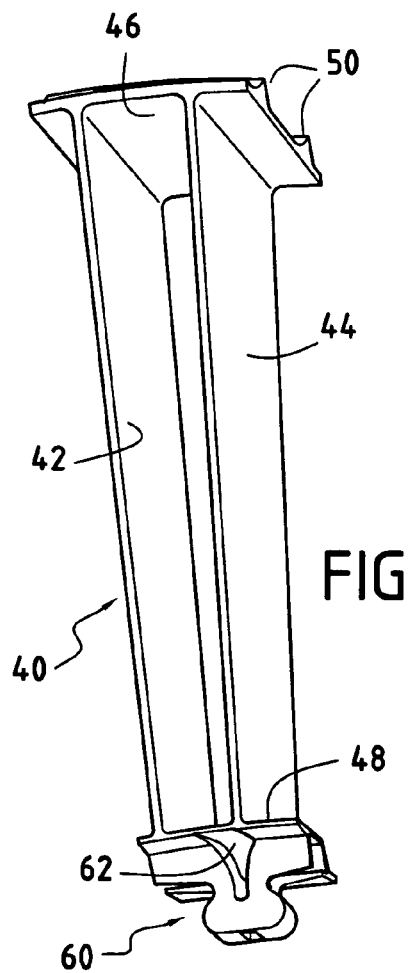
FIG. 3 is a diagrammatic perspective view of a turbine blade insert applying the invention.

With a hollow root 60 of the kind shown by way of example in FIGS. 3 and 4, the resonant frequency can be adjusted by adjusting the thickness of material at the neck 64, i.e. the most constricted portion of the root, which thickness amounts to the sum of the thicknesses 64a and 64b (FIG. 4) on either side of the recess. Thickness can be adjusted by acting in one direction or the other on the width of the recess 62 level with the neck 64, which has no influence on the outside dimensions of the root 60. The thicknesses 64a and 64b are not necessarily equal. Quite a broad range of options is thus made available for adjusting the resonant frequency of the blade without interfering with the aerodynamic behavior or the size of the blade insert.

It should also be observed that making a hollow root contributes to reducing the weight of the moving blade insert, while also opening up the possibility of cooling by having an open cavity in the vicinity of the inner platform, with this being achieved without interfering with mechanical performance. In the example shown, mechanical performance, and in particular ability to withstand the stresses exerted on the moving blade insert, is mainly a function of the thickness of the inner platform and of the flanks 66a and 66b of the root 60, and also of the base 68 of the root 60.

Figure 6:
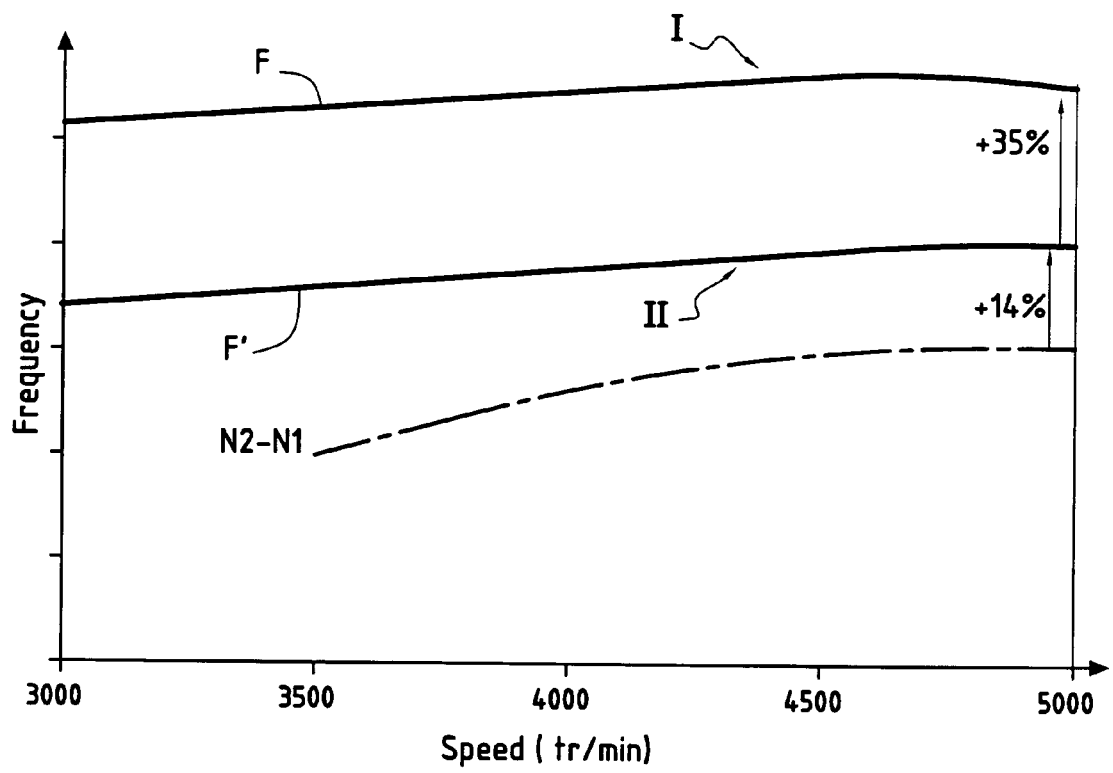
FIG. 6 is a graph plotting curves representing the resonant frequency of an insert as shown in FIG. 3 and of a single-blade insert, as a function of speed of rotation.

In FIG. 6, curve I plots the resonant frequency F of a moving blade insert in the LP turbine of an aviation turbojet, of the kind shown in FIGS. 3 and 4, as a function of the speed of rotation of the LP turbine. This frequency F can be adjusted by adjusting the thickness of material in the neck of the hollow root. In the same graph, curve $N_2-N_1$ represents the main excitation mode at the lowest frequencies where $N_2$ and $N_1$ are the speeds of rotation of the HP and LP turbines, respectively.

By way of comparison, curve II plots the resonant frequency F' of a prior art single-blade moving insert having a blade of the same dimensions and shape as each of the two blades in the insert whose resonant frequency is equal to F, the single-blade insert and the two-blade insert being designed to build up interchangeable turbine wheels having the same dimensions.

It can be seen that at a high speed of rotation, the resonant frequency F' presents a value that is only 14% greater than the value corresponding to the $N_2-N_1$ excitation mode. Unfortunately, it can be seen that increasing the resonant frequency F' so as to take it further away from the $N_2-N_1$ excitation mode is not possible in practice without interfering with the mechanical and aerodynamic behavior of the single-blade insert.

In contrast, by using a two-blade insert, it is possible, by acting on the configuration of the root that is common to both blades, to adjust the resonant frequency so as to give it a value that is far enough away from the frequency of the $N_2-N_1$ excitation mode to avoid any risk of undesirable vibration, and in particular a value that is more than 14% greater than the $N_2$–$N_1$ mode, and is preferably more than 20% greater. Thus, as shown in FIG. 6, the resonant frequency F obtained with the two-blade insert used can be adjusted to have a value that is more than 35% greater than the $N_2$–$N_1$ excitation mode, i.e. more than 21% greater than the frequency of the single-blade insert.

In addition, according to another characteristic of the invention, the latitude available for adjusting the resonant frequency of the moving inserts enables this frequency to be given values that are significantly different for the inserts belonging to the same moving wheel and/or for inserts belonging to different moving wheels making up the LP turbine. Resonant frequencies are said herein to be significantly different when the values of those frequencies differ by at least 1%. Advantageously, the various frequencies are adjusted to values that are more than 14% greater and preferably more than 20% greater than the low frequency $N_2$–$N_1$ excitation mode, as defined above.

Thus, in at least some of the moving wheels, and preferably in all of the moving wheels forming an LP turbine stage, it is possible to use inserts of different resonant frequencies so as to ensure that the moving wheel is out of tune. Various different resonant frequencies are achieved by giving different shapes or dimensions to the recesses in the roots. It is also possible in a single wheel to assemble blade inserts having hollow roots in association with blade inserts having solid roots without any recesses. In order to limit the number of different parts, it is possible in any one wheel to make use of only a few different configurations of insert roots. This serves to avoid vibration occurring simultaneously in all of the inserts of a wheel.

It is also possible to give the blade inserts of one moving wheel a resonant frequency that is different from that of the blade inserts in another moving wheel so as to ensure that the different moving wheels are out of tune with each other. Resonant frequency can be varied from one wheel to another by acting in particular on the shapes and/or dimensions of the recesses in the insert root. It is also possible to make some moving wheels with blade inserts having solid roots without any recesses. This serves to avoid vibration appearing simultaneously in all of the moving wheels of a turbine.

The two above possibilities can be combined, i.e. with moving wheels in which at least some of them are out of tune at a set of resonant frequencies for their blade inserts that differ between different wheels.

Other modifications can also be made to the embodiment described above without going beyond the ambit of the invention.

Figure 7:
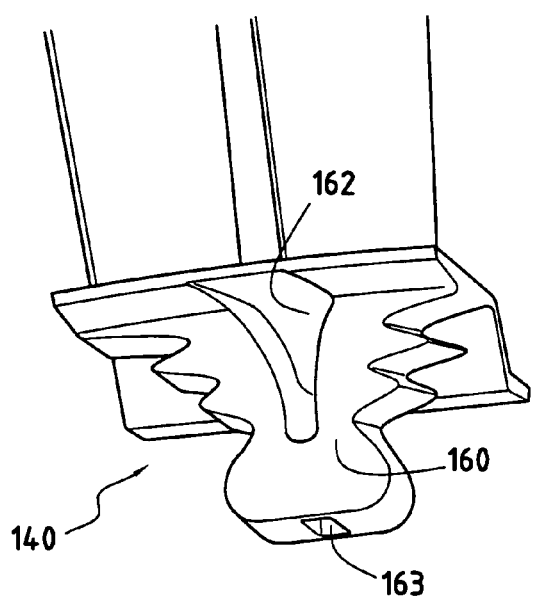
FIG. 7 is a diagrammatic view on a larger scale showing the inside end portion of a moving blade insert in another embodiment of the invention.

Thus, in another embodiment shown diagrammatically in FIG. 7, the insert 140 differs from that of FIGS. 3 and 4 solely in that the root 160 of the insert 140 is Christmas-tree-shaped. Frequency can be adjusted as described above by conferring a particular configuration to a recess 162 which is preferably blind and which is formed in the root 160. The root 162 may open out via an orifice 163 in the base of the root 160.

In another embodiment, the moving blade insert may have more than two blades united between common outer and inner platforms and associated with a common root.

Although the above description relates to an LP turbine for a turbomachine, the invention can also be applied to the moving wheels of the HP turbines of turbomachines. The invention can also be applied not only to aviation turbines, but also to industrial turbines.

The invention claimed is:

1. A method of making a turbomachine turbine, the turbine comprising one moving wheel having a rotor and a plurality of blade inserts, each of the inserts connected thereto used for the moving wheel comprising at least two blades interconnected by common inner and outer platforms and sharing a common root, the method comprising providing each of at least some of the blade inserts with a hollow root by forming a recess in the insert root, with hollow insert roots belonging to the wheel being voluntarily given different configurations for the recesses in their roots so as to adjust the resonant frequencies of the corresponding blade inserts to values that are significantly different and connecting the blade inserts to the rotor of the moving wheel, with the recesses formed in the hollow roots remaining free, thereby ensuring that the blade inserts of the wheel are out of tune.

2. A method as claimed in claim 1, wherein blade inserts are used including at least some having a solid root without any recess.

3. A method of adjusting the resonant frequency of a moving blade insert in a turbine of a turbomachine turbine having a high-pressure turbine (HP) and a low-pressure turbine (LP), the turbine having a rotor and a plurality of blade inserts connected thereto, wherein the insert has at least two blades interconnected by common inner and outer platforms and sharing a common root, the method comprising forming a recess in the insert root, said recess remaining free after connection of the insert to the rotor, and adjusting the resonant frequency of the insert to a value that is more than 14% greater than the excitation mode corresponding to $N_2$–$N_1$, where $N_2$ and $N_1$ are the speeds of rotation of the HP and LP turbines, respectively, by adjusting the configuration of the free recess formed in the insert root.

4. A method as claimed in claim 3, wherein the insert is made with a root in the form of a bulb, and its resonant frequency is adjusted by acting on the thickness of material on either side of the recess, level with a portion of the root that forms a neck.

5. A method as claimed in claim 3, wherein thicknesses of material on either side of the recess are different from each other.

6. A staged turbine for a turbomachine, the turbine comprising at least one moving wheel having a rotor and a plurality of blade inserts connected thereto, each blade insert comprising at least two blades interconnected by common outer and inner platforms and sharing a common root, wherein at least some of the inserts of the same moving wheel and/or of different moving wheels have hollow roots in which respective free recesses are formed presenting configurations that differ from one another so that the respective inserts have resonant frequencies that are significantly different from one another.

7. A turbine as claimed in claim 6, wherein each recess opens out into at least one side of each respective root.

8. A turbine as claimed in claim 7, wherein each recess is blind, opening out in one side only of each respective root.

9. A turbine as claimed in claim 6, wherein some of the inserts have a root without any recess.

10. A turbine as claimed in claim 6, for a turbomachine having a high-pressure turbine (HP) and a low-pressure turbine (LP), wherein each moving blade insert of the turbine has a resonant frequency that is more than 14% greater than the excitation mode corresponding to $N_2$–$N_1$, where $N_2$ and $N_1$ are the speeds of rotation of the HP and LP turbines, respectively.

11. A staged turbine as claimed in claim 6, further comprising:
a plurality of deflectors each disposed between inner platforms of pairs of adjacent inserts.

12. A method of making a turbomachine turbine, the turbine comprising one moving wheel having a rotor and a plurality of blade inserts connected thereto, each of the inserts used for the moving wheel comprising at least two blades interconnected by common inner and outer platforms and sharing a common bulb- or Christmas-tree-shaped root, the method comprising providing each of at least some of the blade inserts with a hollow root by forming a recess in the insert root, with hollow insert roots belonging to the wheel being voluntarily given different configurations for the recesses in their roots so as to adjust the resonant frequencies of the corresponding blade inserts to values that are significantly different, and connecting the blade inserts to the rotor of the moving wheel by engaging the bulb- or Christmas-tree-shaped root in a housing of complementary shape formed in the corresponding rotor, with the recesses formed in the hollow roots remaining free, thereby ensuring that the blade inserts of the wheel are out of tune.

13. A method as claimed in claim 12, wherein blade inserts are used including at least some having a solid root without any recess.

14. A staged turbine for a turbomachine, the turbine comprising at least one moving wheel having a rotor and a plurality of blade inserts connected thereto, each blade insert comprising at least two blades interconnected by common outer and inner platforms and sharing a bulb- or Christmas-tree-shaped common root engaged in a housing of complementary shape formed in the rotor, wherein at least some of the inserts of the same moving wheel and/or of different moving wheels have hollow roots in which respective free recesses are formed presenting configurations that differ from one another so that the respective inserts have resonant frequencies that are significantly different from one another.

15. A turbine as claimed in claim 14, wherein each recess opens out into at least one side of each respective root.

16. A turbine as claimed in claim 14, wherein each recess is blind, opening out in one side only of each respective root.

17. A turbine as claimed in claim 14, wherein some of the inserts have a root without any recess.

18. A turbine as claimed in claim 14, for a turbomachine having a high-pressure turbine (HP) and a low-pressure turbine (LP), wherein each moving blade insert of the turbine has a resonant frequency that is more than 14% greater than the excitation mode corresponding to $N_2-N_1$, where $N_2$ and $N_1$ are the speeds of rotation of the HP and LP turbines, respectively.

19. A method of making a turbomachine turbine, the turbine comprising a plurality of moving wheels each having a rotor and a plurality of blade inserts, each of the inserts connected thereto used for the moving wheels comprising at least two blades interconnected by common inner and outer platforms and sharing a common root, the method comprising providing each of at least some of the blade inserts with a hollow root by forming a recess in the insert root, with hollow insert roots belonging to two different wheels being voluntarily given different configurations for the recesses in their roots so as to adjust the resonant frequencies of the corresponding blade inserts to values that are significantly different and connecting the blade inserts to the rotors of the moving wheels, with the recesses formed in the hollow roots remaining free, thereby ensuring that the blade inserts between two different wheels are out of tune.

20. A method as claimed in claim 19, wherein blade inserts are used including at least some having a solid root without any recess.

21. A method of making a turbomachine turbine, the turbine comprising a plurality of moving wheels each having a rotor and a plurality of blade inserts connected thereto, each of the inserts used for the moving wheels comprising at least two blades interconnected by common inner and outer platforms and sharing a common bulb- or Christmas-tree-shaped root, the method comprising providing each of at least some of the blade inserts with a hollow root by forming a recess in the insert root, with hollow insert roots belonging to two different wheels being voluntarily given different configurations for the recesses in their roots so as to adjust the resonant frequencies of the corresponding blade inserts to values that are significantly different, and connecting the blade inserts to the rotors of the moving wheels by engaging the bulb- or Christmas-tree-shaped root in a housing of complementary shape formed in the corresponding rotor, with the recesses formed in the hollow roots remaining free, thereby ensuring that the blade inserts between two different wheels are out of tune.

22. A method as claimed in claim 21, wherein blade inserts are used including at least some having a solid root without any recess.

* * * * *